United States Patent [19]
Tuttle et al.

[11] Patent Number: 5,396,814
[45] Date of Patent: Mar. 14, 1995

[54] METHOD OF HAT TAPPING A PIPE FOR INSTALLING IONIC FLOWMETER TRANSDUCERS

[75] Inventors: Dennis H. Tuttle, Williamsville, N.Y.; Henry E. Ryer, Tulsa; Larry T. Riley, Broken Arrow, both of Okla.

[73] Assignee: Mesa Laboratories, Inc., Wheat Ridge, Colo.

[21] Appl. No.: 68,625

[22] Filed: May 27, 1993

[51] Int. Cl.[6] .................................. G01F 15/18
[52] U.S. Cl. ........................... 73/866.5; 137/315
[58] Field of Search ............ 73/866.5, 861.27; 137/315

[56] References Cited

U.S. PATENT DOCUMENTS

| | | | |
|---|---|---|---|
| 3,614,252 | 10/1973 | Rose et al. | 408/9 |
| 4,631,967 | 12/1986 | Welker | 73/866.5 X |
| 4,841,787 | 6/1989 | Waterman | 73/866.5 |
| 4,880,028 | 11/1989 | Osburn et al. | 137/315 |
| 5,106,580 | 4/1992 | Mudian | 73/866.5 X |
| 5,138,755 | 8/1992 | Evans et al. | 73/866.5 X |
| 5,159,838 | 11/1992 | Lynnworel | 73/866.5 X |
| 5,174,325 | 12/1992 | Okel et al. | 73/866.5 X |
| 5,303,602 | 4/1994 | Morgan | 73/866.5 |
| 5,325,734 | 7/1994 | Jordan | 73/866.5 |

Primary Examiner—Thomas P. Noland
Attorney, Agent, or Firm—Head & Johnson

[57] ABSTRACT

A method of hot tapping a pipe for installing a carrier for use with a sonic flowmeter transducer includes the steps of welding an alignment fixture to the pipe, attaching a drilling device to the alignment fixture, drilling a hole in the pipe, removing the drilling device and replacing it with a cleaning assembly to remove metal shavings, replacing the cleaning assembly with an extraction assembly which is used to remove the drilling device, removing the extraction assembly and installing an insertion assembly to which a carrier is removably attached. The insertion assembly is employed to secure the carrier to the alignment fixture. The insertion assembly and the drilling device are then detached from the alignment fixture and are ready for reuse.

2 Claims, 9 Drawing Sheets

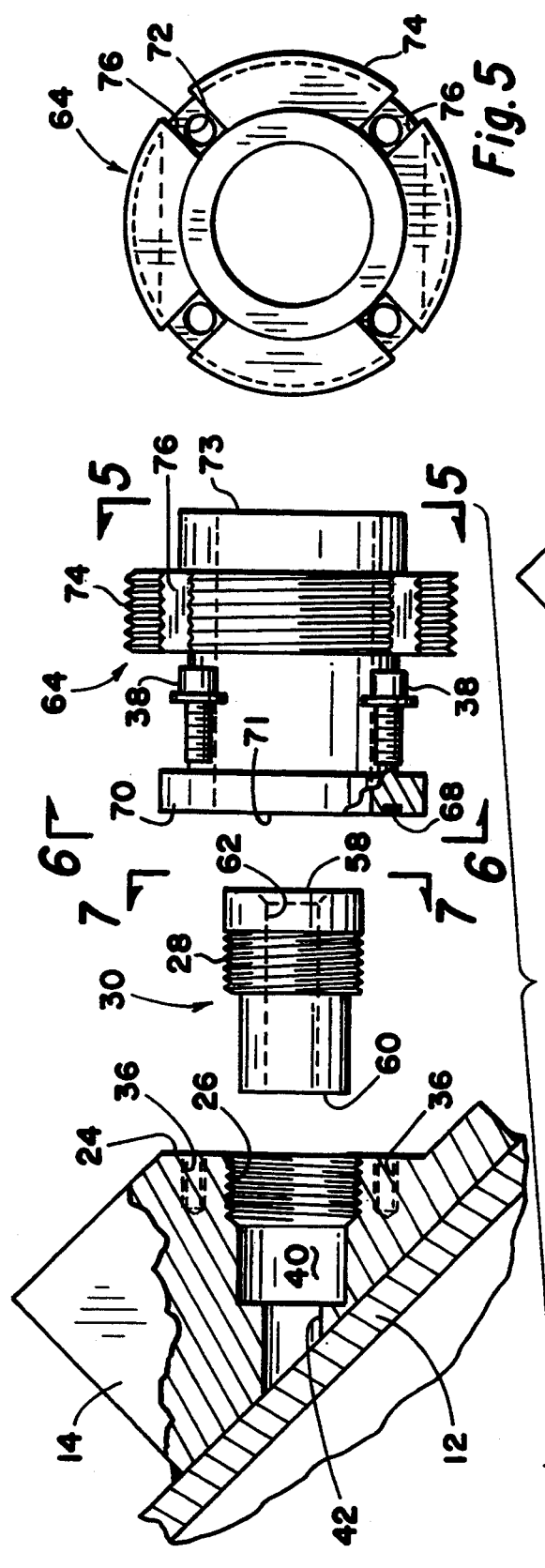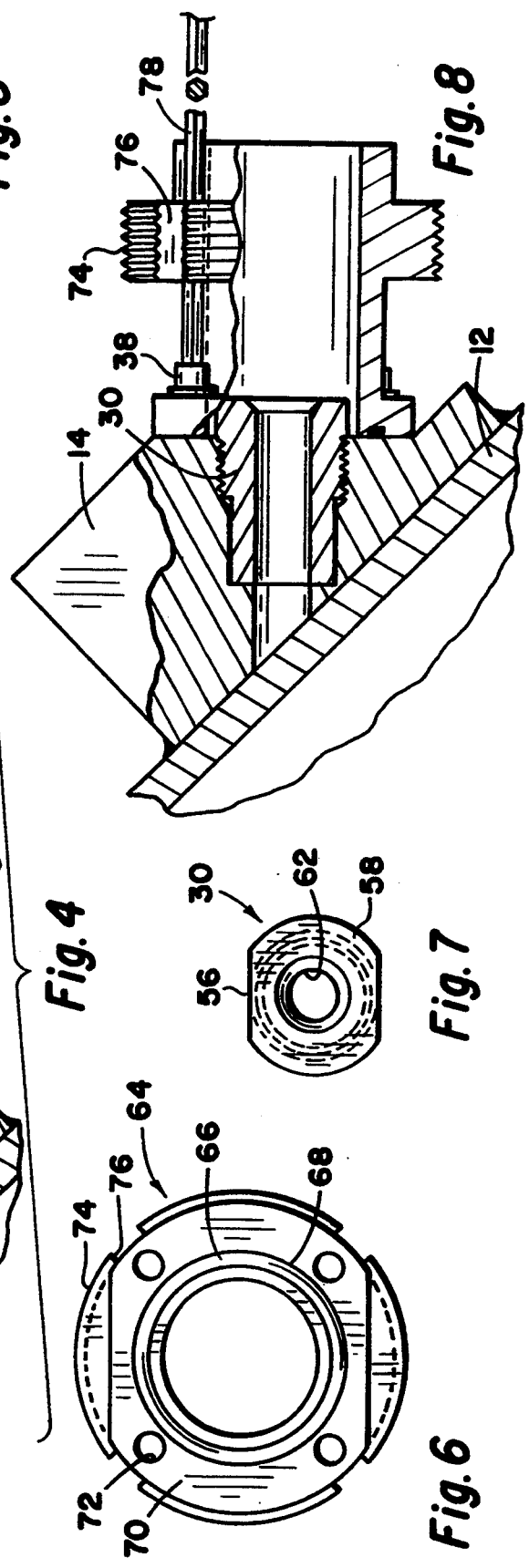

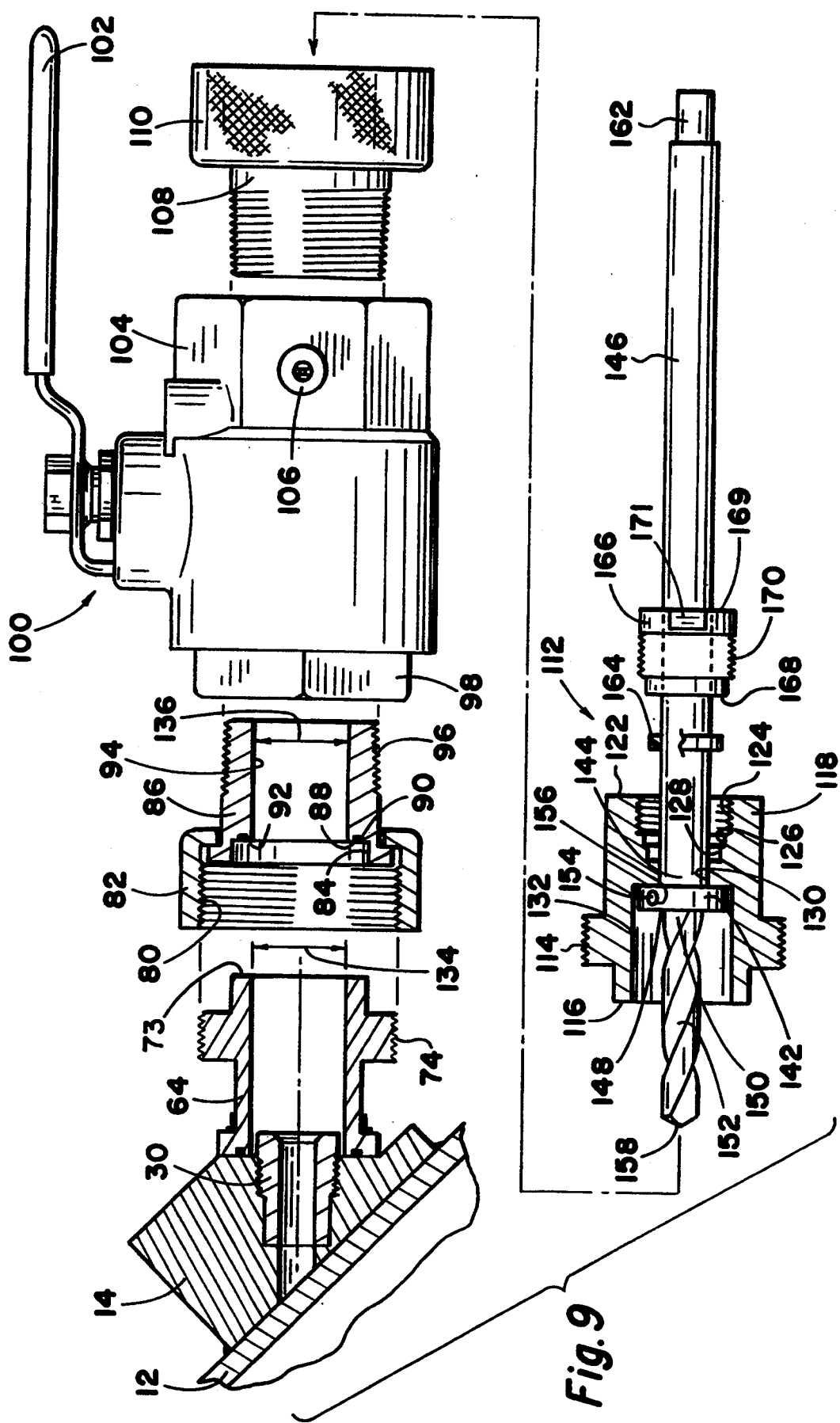

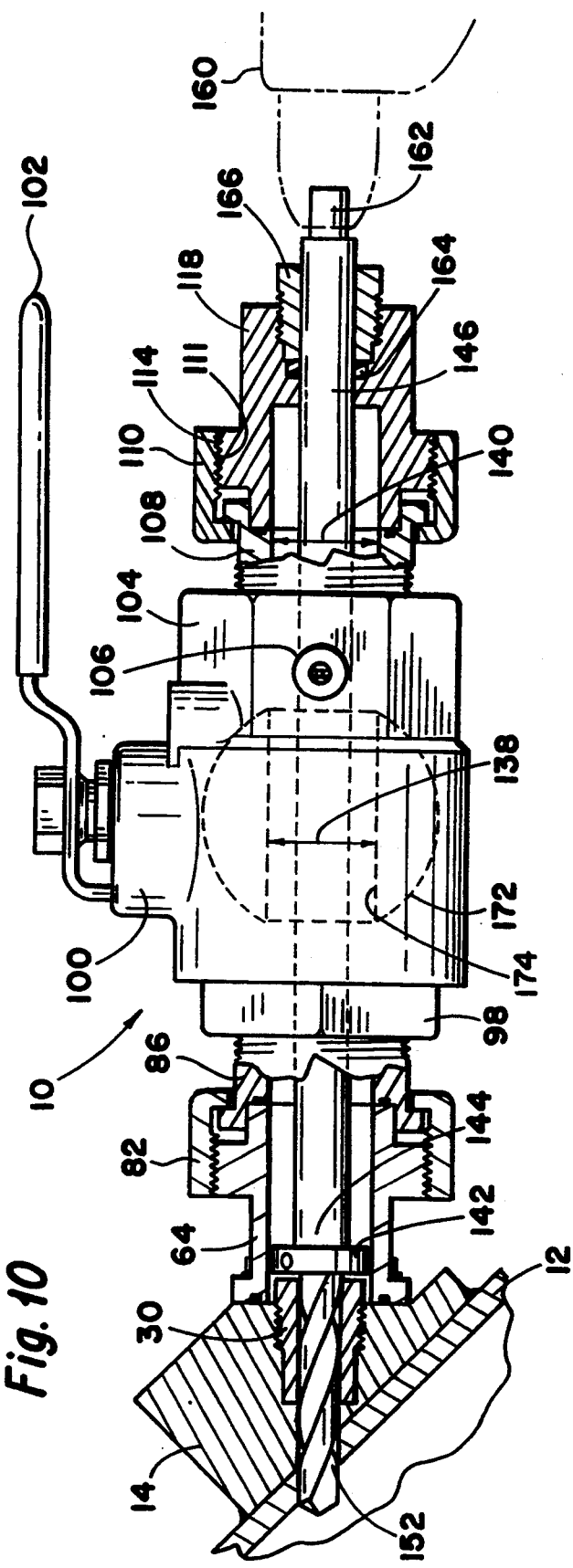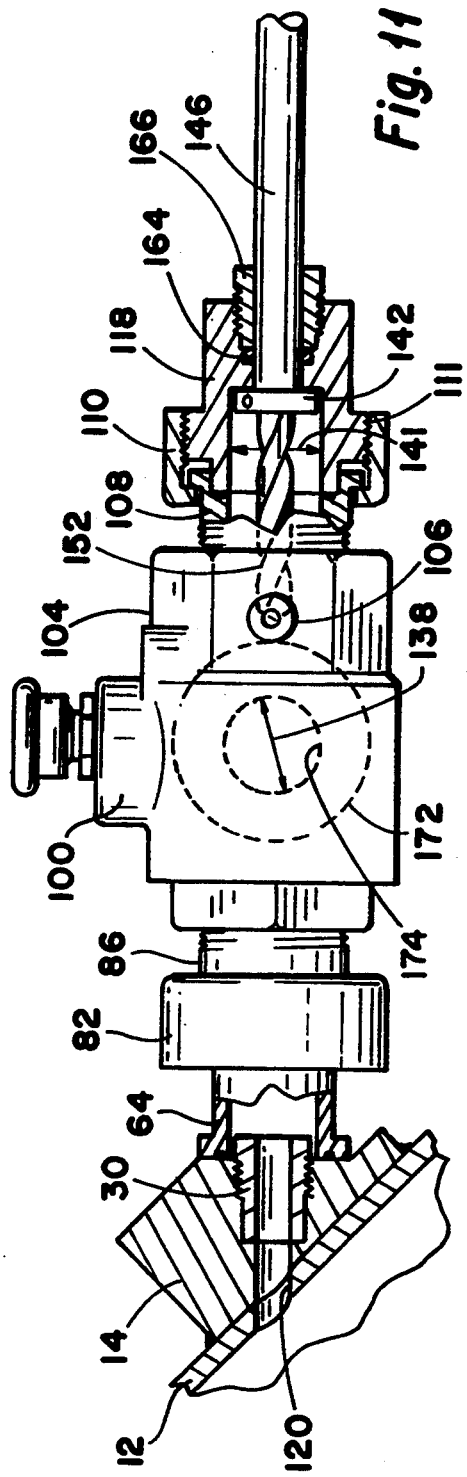

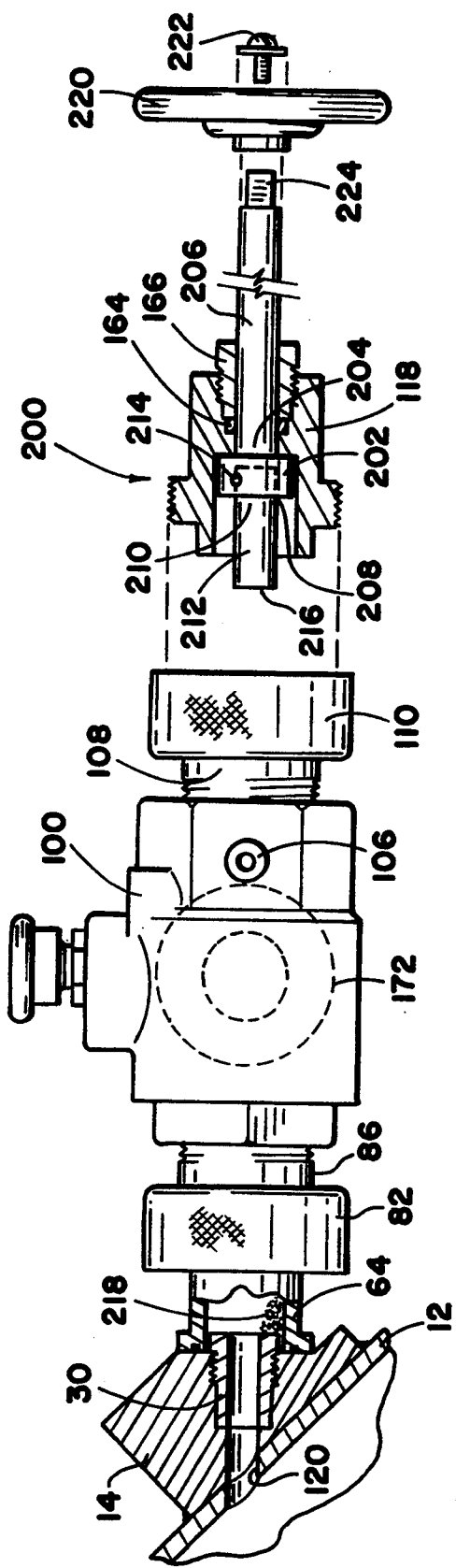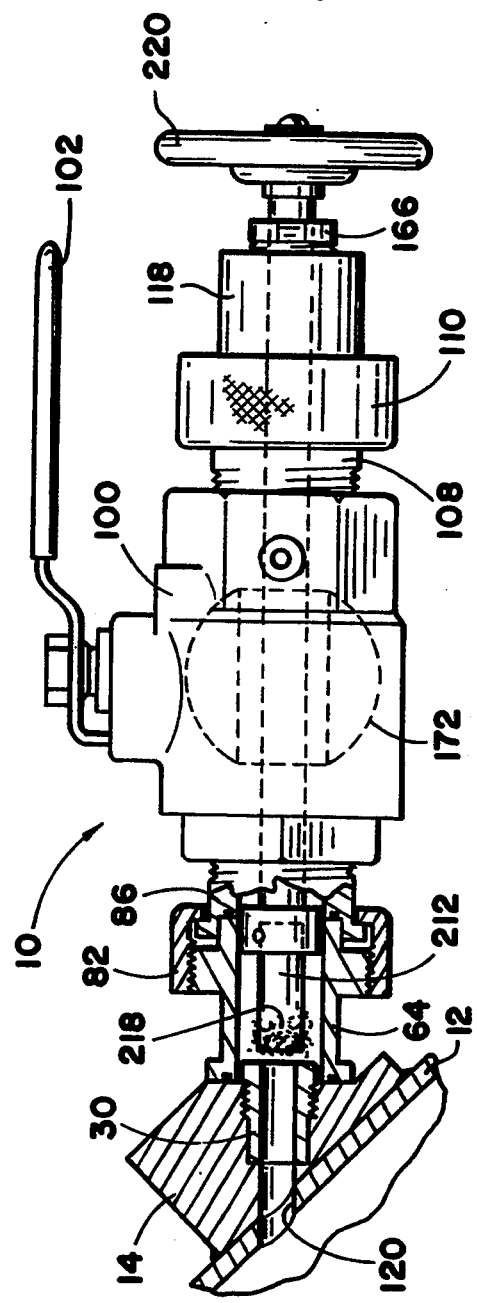
Fig. 12
Fig. 13

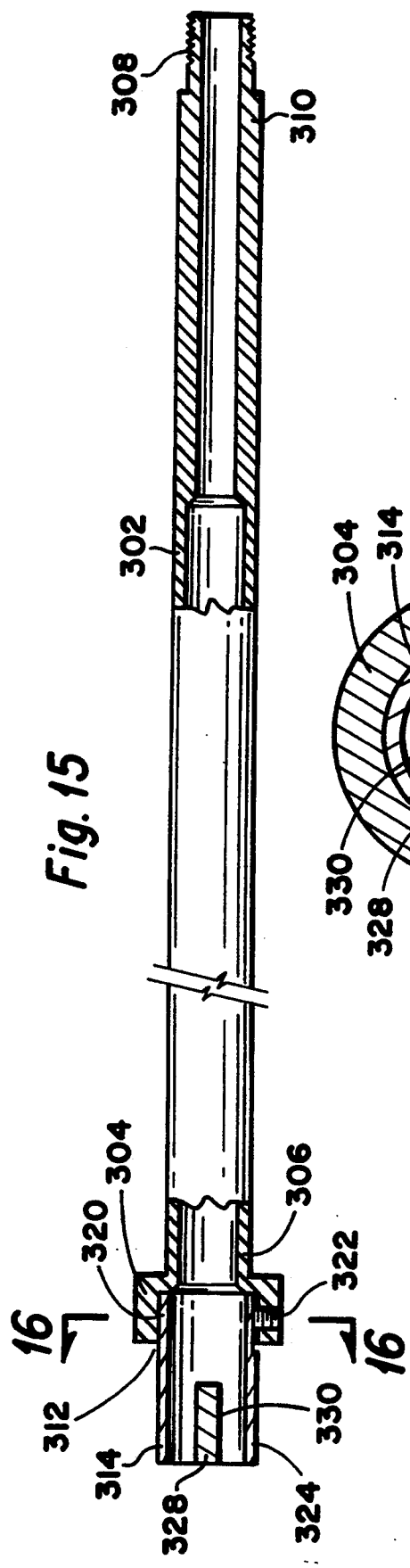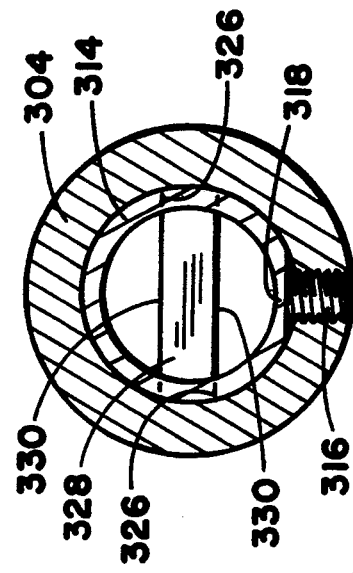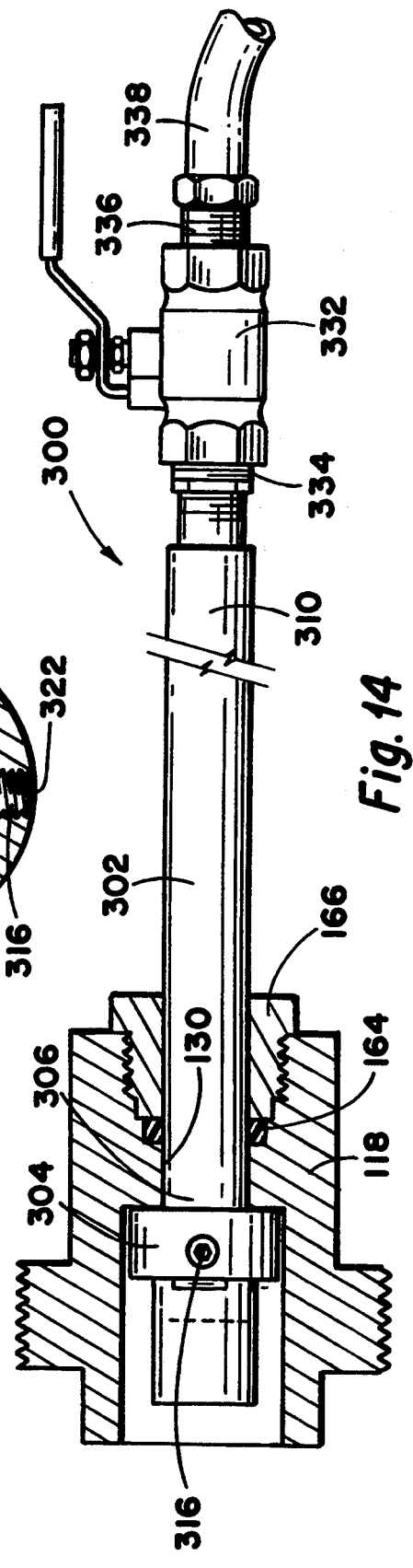

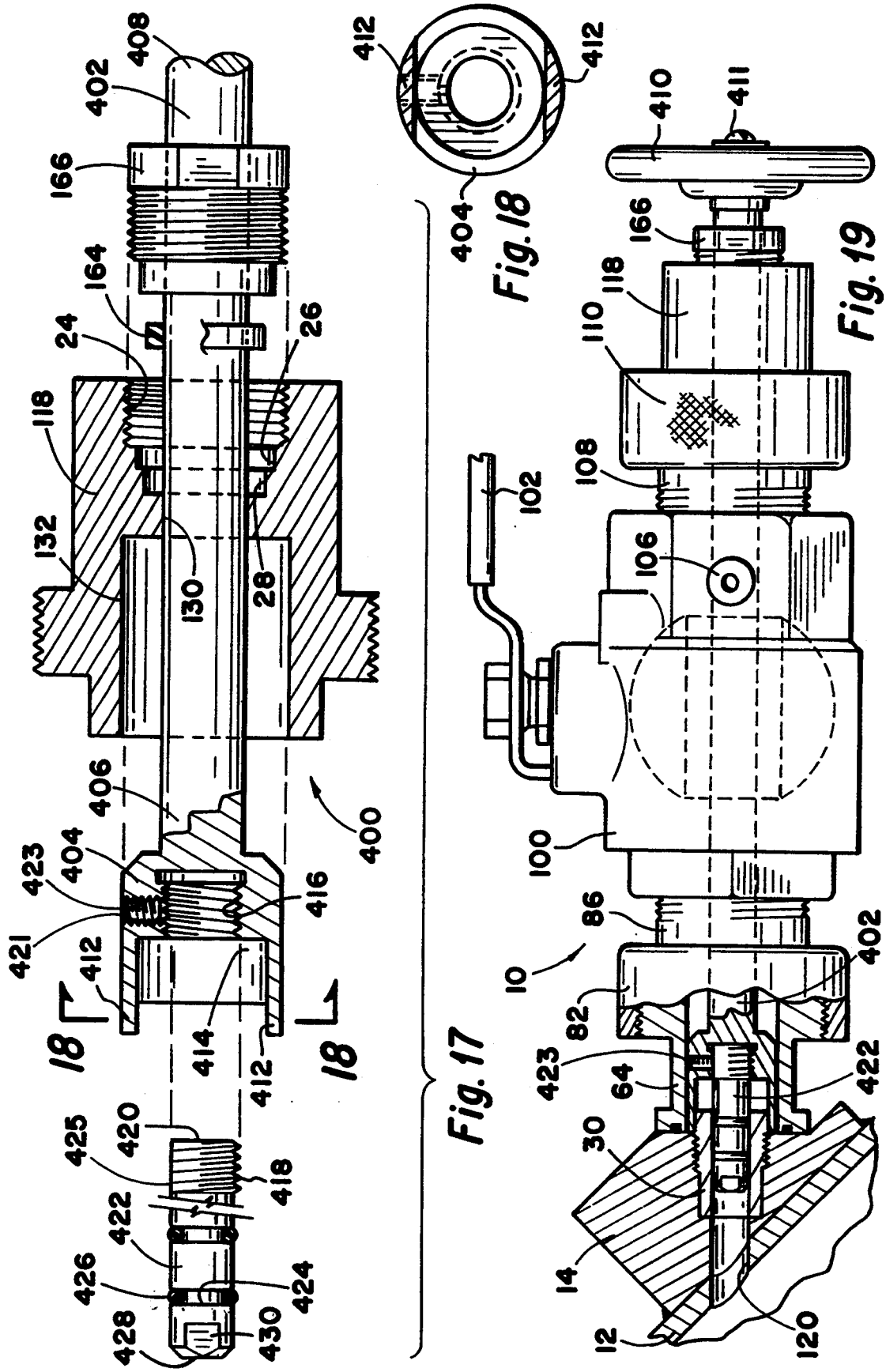

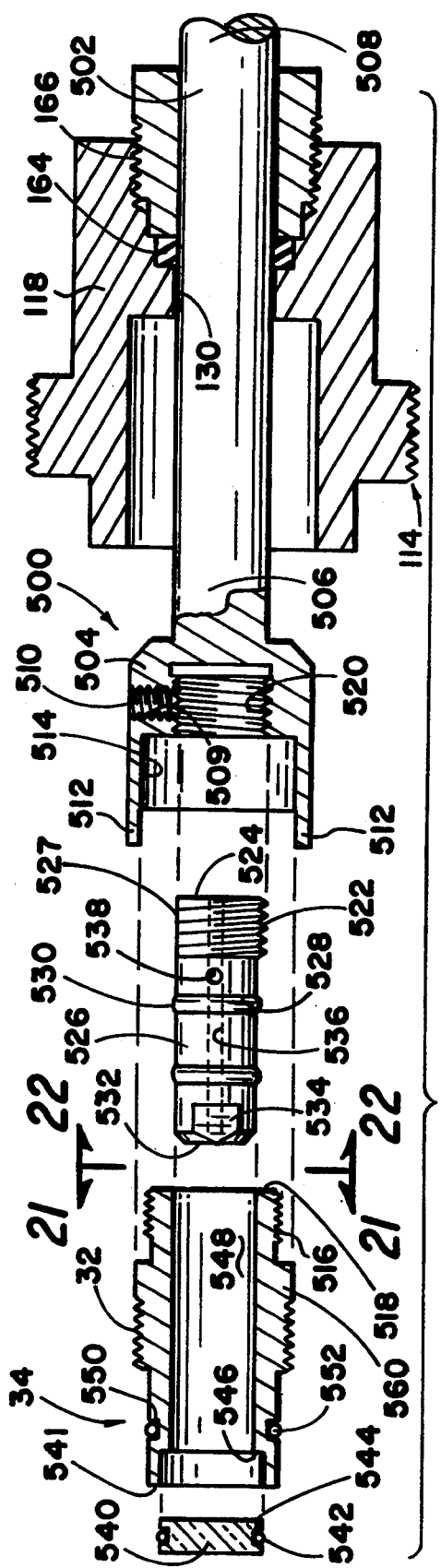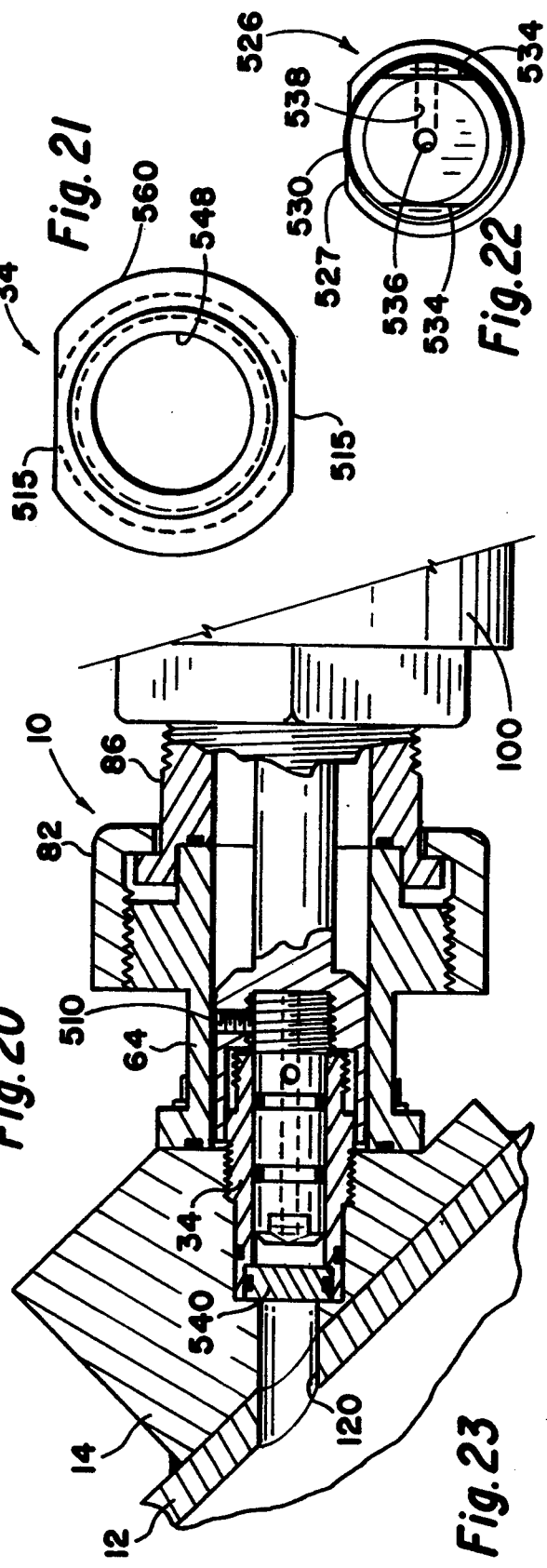
Fig. 20
Fig. 21
Fig. 22
Fig. 23

METHOD OF HAT TAPPING A PIPE FOR INSTALLING IONIC FLOWMETER TRANSDUCERS

BACKGROUND OF THE INVENTION

1. Field Of The Invention

The present invention relates to a method of and device for hot tapping a pipe at an angle with respect to the pipe's longitudinal axis. More specifically, the present invention relates to a method and device for hot tapping a pipe from two spaced apart locations to provide access extending into the pipe at an intersecting angle and using this type of hot tapping system for installing a transducer carrier in an alignment fixture attached to the pipe.

2. Description Of The Related Art

One method for measuring the flow of liquid within heating, ventilating, and air conditioning (HVAC) pipes utilizes a pair of sonic flowmeter transducers. This measuring method spaces the transducers apart on a side of the pipeline so that each transducer receives sound waves which originated from the other transducer and which were received after bouncing off of an interior surface of the pipe located on a side of the pipe opposite the side where the transducers are located.

The transducers insert into threaded sensor carriers which have previously been attached to alignment fixtures which were welded onto the pipe and through which the pipe has been tapped. Each of the threaded sensor carriers is provided with a window between the transducer and the interior of the pipe to prevent liquid within the pipe from reaching the transducer through the tapped opening in the pipe. The threaded sensor carriers and the alignment fixtures, by which the threaded sensor carriers are attached to the pipe, hold the transducers in place the proper distance apart and at the proper angle with respect to the pipe's longitudinal axis.

Previous methods and devices for tapping a pipe are designed to drill a hole perpendicular to the pipe's longitudinal axis. Therefore, when employed to drill a hole in the pipe at an angle approximately 45 degrees from the pipe's longitudinal axis, these devices tend to "walk" down the pipe unless provisions are taken to provide a starting hole at the desired angle. This tendency to "walk" makes it difficult to achieve the proper spacing required between the two transducers using previous methods and devices.

Also, existing devices provide only a means for cutting a hole through the wall of a pressurized pipe. After the hole is cut, some other device is passed through the hole to measure some property of the liquid.

The present invention addresses the problem of the drill bit "walking" down the pipe by providing a method and a device for drilling a hole through a pipe at an alignment fixture so that the hole is positioned at a specific location and is oriented at a desired angle to the pipe's longitudinal axis. Also, the present invention provides a means for cleaning out the metal shavings resulting from drilling the pipe hole and a means for inserting a threaded sensor carrier into the alignment fixture adjacent the pipe hole, after which the hot tapping equipment is removed. Once a pair of carriers are in place, a sonic flowmeter transducer may be removably inserted into each carrier to allow the flow within the pipe to be measured.

BRIEF SUMMARY OF THE INVENTION

Briefly the present invention is a method and device for hot tapping a pipe at an angle to the pipe's longitudinal axis and installing a transducer or sensor carrier over the pipe hole thus formed. An alignment fixture is first positioned on and welded to an outside wall of the pipe. A drill bushing is then secured in an opening provided in an angled surface of the alignment fixture, a flange is secured to the angled surface, and a ball valve is secured to the flange. A drill assembly is removably attached to the ball valve. A drill rod is movably provided on the drill assembly and a drill bit attaches to the drill rod. The drill bit is used to drill the pipe hole by inserting the drill bit through the drill bushing and through a small hole provided in the alignment fixture which together serve as guides to prevent the drill bit from "walking" down the pipe as the drill bit is subsequently rotated to drill the pipe hole.

Once the pipe hole is drilled, the drill bit is moved upward away from the pipe until it clears the ball valve. By closing the ball valve, the drilling assembly is isolated from the pipe so that the drill assembly can be removed from the device and replaced with a cleaning assembly. One of two types of cleaning assemblies may be used, either a magnetic cleaning assembly for use when the pipe being tapped is magnetic, or a non-magnetic cleaning assembly for use when the pipe being tapped is non-magnetic.

If the magnetic cleaning assembly is employed, after the magnetic cleaning assembly has been attached to the ball valve, the ball valve is reopened and a magnet rod which is movably provided on the magnetic cleaning assembly is moved downward toward the pipe until a magnet provided on the magnet rod bottoms out within the device. Metal shavings created in the drilling process are attracted to and adhere to the magnet which is then withdrawn upward past the ball valve. The ball valve is closed and the magnetic cleaning assembly is detached from the valve and cleaned of the metal shavings. The magnetic cleaning assembly is then reattached and the cleaning process is repeated until the magnet no longer removes metal shavings. The magnet is then withdrawn upward, the ball valve is closed, and the magnetic cleaning assembly is removed from the device and replaced with an extraction assembly.

Alternately, if the non-magnetic cleaning assembly is employed instead of the magnetic cleaning assembly, the ball valve is reopened after the non-magnetic cleaning assembly has been attached thereto. A hollow stirring rod which is movably provided on the non-magnetic cleaning assembly is then moved downward toward the pipe until a stirring rod provided on the non-magnetic cleaning assembly bottom outs within the device. A cleaning assembly valve provided on the non-magnetic cleaning assembly and having liquid communication through the hollow stirring rod is opened while the stirring rod is rotated in order to flush non-magnetic shavings which were created in the drilling process out of the device. The cleaning assembly valve is then reclosed and the stirring rod is moved upward away from the pipe until it clears the ball valve. The ball valve is then again closed and the non-magnetic cleaning assembly is removed from the device and replaced with the extraction assembly.

Once the cleaning process is completed the extraction assembly is attached to the ball valve and the ball valve is reopened. A drill bushing retainer movably attached to an extraction rod movably provided on the extraction assembly is moved toward the pipe until the drill bushing retainer engages the drill bushing. The extraction rod is then turned, causing the drill bushing to detach from the alignment fixture. The extraction rod drill bushing retainer and attached drill bushing are then withdrawn past the ball valve, the ball valve is closed and the extraction assembly is removed from the ball valve and replaced by an insertion assembly.

A sensor carrier retainer is removably attached to an insertion rod movably provided on the insertion assembly, and a sensor carrier is removably attached to the sensor carrier retainer. Once the insertion assembly is attached to the ball valve, the ball valve is reopened and the insertion rod is used to move the carrier toward the pipe and to secure the carrier to the alignment fixture. The sensor carrier retainer is then detached from the sensor carrier, and the ball valve and insertion assembly are removed from the alignment fixture. After the device has been removed from the first alignment fixture, it is then ready for use with a second alignment fixture.

DESCRIPTION OF THE DRAWINGS

FIG. 4 is an exploded front elevation showing attachment of a drill bushing and boss flange to the alignment fixture.

FIG. 5 is a top end view of the boss flange taken along line 5—5 of FIG. 4.

FIG. 6 is a base end view of the boss flange taken along line 6—6 of FIG. 4.

FIG. 7 is an external end view of the drill bushing taken along line 7—7 of FIG. 4.

FIG. 8 is a partially cutaway front elevation illustrating how the boss flange is secured to the alignment fixture by means of socket head screws.

FIG. 9 is a partially exploded front elevation showing attachment of a ball valve to the boss flange and attachment of a drill assembly to the ball valve.

FIG. 10 is a front elevation illustrating how the drill assembly is employed to drill a hole in a pipe.

FIG. 11 is a front elevation illustrating withdrawal of the drill rod and drill bit beyond the ball valve so that the ball valve can be closed to isolate the drill assembly from the pipe.

FIG. 12 is a front elevation showing a magnetic cleaning assembly being attached to the ball valve.

FIG. 13 is a front elevation showing the magnet of the magnetic cleaning assembly bottomed out at the drill bushing and showing magnetic shavings adhering to the magnet.

FIG. 14 is a partially cutaway front elevation of an alternate embodiment of a cleaning assembly for use on a non-magnetic pipe.

FIG. 15 is a partially cutaway front elevation of the cleaning assembly of FIG. 14 showing the hollow stir rod and the hollow holder in detail.

FIG. 16 is a cross-sectional view taken along line 16—16 of FIG. 15.

FIG. 17 is a partially cutaway and exploded front elevation view of an extraction assembly.

FIG. 18 is a cross-sectional view of the extraction rod head taken along line 18—18 of FIG. 17.

FIG. 19 is a partially cutaway front elevation showing engagement of the drill bushing retainer with the drill bushing.

FIG. 20 is a partially cutaway exploded front elevation of an insertion assembly with attached sensor carrier.

FIG. 21 is a cross-sectional view of the external end of the sensor carrier taken along line 21—21 of FIG. 20.

FIG. 22 is a cross-sectional view of the extending end of the sensor carrier retainer taken along line 22—22 of FIG. 20.

FIG. 23 is a partially cutaway front elevation illustrating attachment of the sensor carrier to the alignment fixture.

DETAILED DESCRIPTION OF THE PREFERRED EMBODIMENT

The Device

Figure 1:
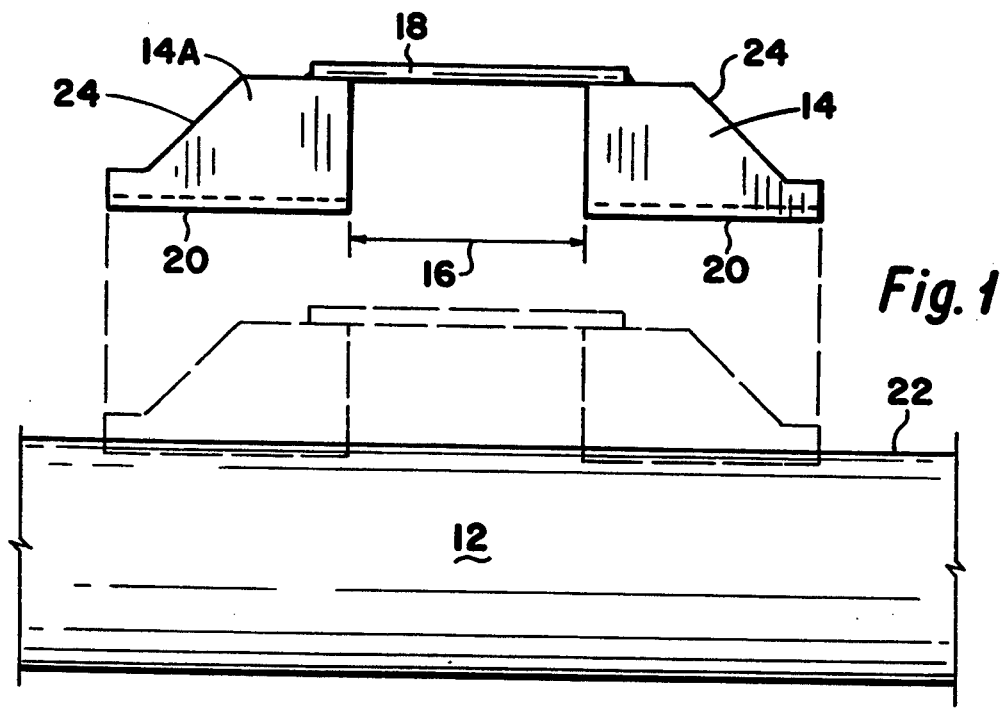
FIG. 1 is a front elevation of a pipe illustrating the placement of two alignment fixtures onto the pipe.
Figure 3:
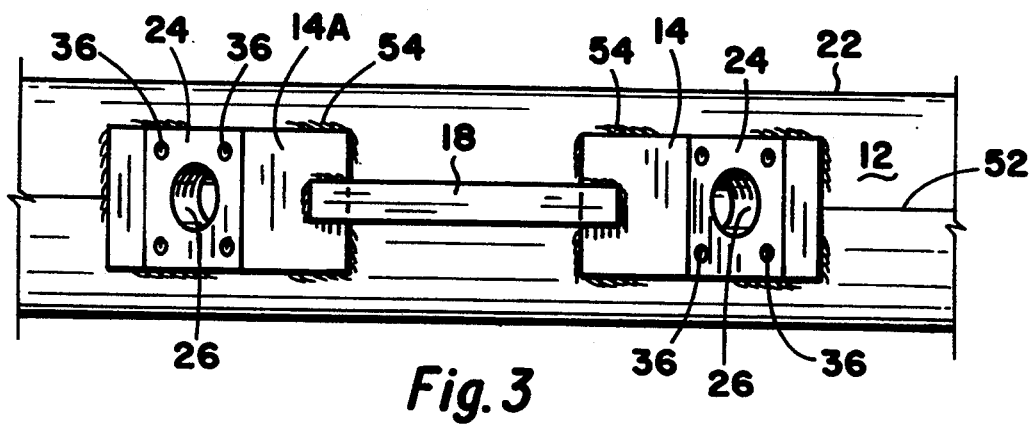
FIG. 3 is a top plan view of FIG. 2.
Figure 2:
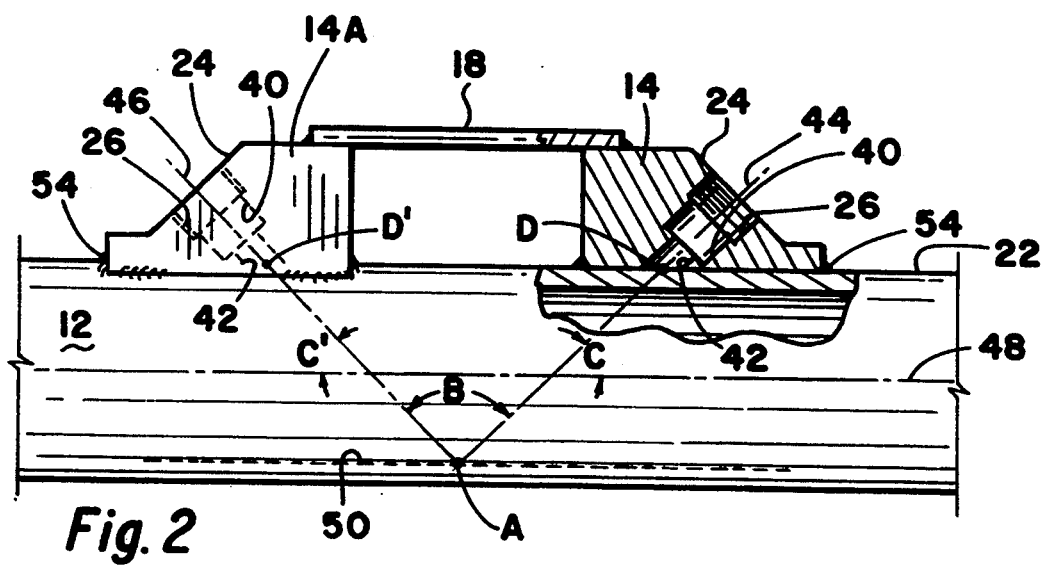
FIG. 2 is a front elevation of the pipe and alignment fixtures of FIG. 1 illustrating the intersecting angle of access provided via holes drilled through the pipe at the alignment fixtures.

Referring now to the drawings and initially to FIGS. 10, 13, 19 and 23, there is illustrated a hot tapping device 10 constructed according to a preferred embodiment of the present invention. The hot tapping device 10 attaches to a pipe 12 by means of either a first alignment fixture 14 or a second alignment fixture 14A. As illustrated in FIGS. 1, 2 and 3, the first alignment fixture 14 and the second alignment fixture 14A are secured, preferably by welding, to the pipe 12 so that an appropriate distance 16 lies between them and they are aligned with each other along one side of the pipe 12.

As shown in FIG. 1, a spacer 18 is normally welded to the alignment fixtures 14 and 14A in order to hold the alignment fixtures 14 and 14A the appropriate distance 16 apart and in alignment with each other as the alignment fixtures 14 and 14A are welded to the pipe 12. The alignment fixtures 14 and 14A are each provided with a lower face 20 which has been machined with a proper curvature to match a curvature of an outside wall 22 of the pipe 12.

As illustrated in FIGS. 2 and 3, the alignment fixtures 14 and 14A are each provided with an upward facing angled surface 24 which is pre-machined to provide a female threaded opening 26 designed to removably accept male threads 28 provided on a drill bushing 30, as shown in FIG. 4, and later removably accept male threads 32 provided on a sensor carrier 34, as shown in FIGS. 20 and 23 and as will hereinafter be more fully explained. Each of the upward facing surfaces 24 is also provided with a plurality of tapped holes 36 designed to accept socket head screws 38 that are to be employed for securing the hot tapping device 10 to the alignment fixture, either 14 or 14A, after the alignment fixtures 14 and 14A have been welded to the pipe 12, as will be further described below.

Alignment fixtures 14 and 14A are identical except that they are oriented 180 degrees from each other on the pipe 12. Each of the alignment fixtures 14 and 14A is provided with a large hole 40 which communicates with the female threaded opening 26 and also provided with a small hole 42 which communicates between the large hole 40 and the lower face 20 so that the female threaded opening 26 and the large and small holes 40 and 42 are all aligned and centered around either a first or a second alignment fixture axis 44 and 46 respectively. Each of the alignment fixture axes 44 and 46 is oriented at a desired angle "C" and "C'" with respect to the longitudinal axis 48 of the pipe 12. Angles "C" and "C'" are each preferably approximately 45 degrees, and the distance 16 between the first and second alignment fixtures 14 and 14A is preferably such that the first and second alignment fixture axes 44 and 46 intersect at a point "A" located on an inside wall 50 of pipe 12 so that an angle "B" is formed between the two alignment fixture axis 44 and 46. Angle "B" is preferably a right angle.

In order to aid in aligning the pair of alignment fixtures 14 and 14A along the pipe 12, a center line 52, illustrated in FIG. 3, can be scribed onto the outside wall 22 of the pipe 12, and the alignment fixtures 14 and 14A line up with respect to each other by reference to the center line 52. As shown in FIGS. 2 and 3, each of the alignment fixtures 14 and 14A is secured to the pipe 12 by continuous welding all around the alignment fixtures 14 and 14A so that the lower faces 20 are sealed to the outside wall 22 of the pipe 12 by means of welds 54 which form liquid impermeable seals between the alignment fixtures 14 and 14A and the pipe 12.

Once the alignment fixtures 14 and 14A have been secured to the pipe 12, the male threads 28 of the drill bushing 30 are engaged with the female threaded opening 26, and the male threads 28 of drill bushing 30 are secured within the female threaded opening 26 by rotating the drill bushing 30. Flats 56, as illustrated in FIG. 7, are provided on an external end 58 of the drill bushing 30. As the male threads 28 are secured within the female threaded opening 26, an opposite internal end 60 provided on the drill bushing 30 and having a reduced external diameter enters the large hole 40. A longitudinally oriented opening 62 is provided in the drill bushing 30 so that the opening 62 extends between the external and internal ends 58 and 60, communicating on the internal end 60 with the small hole 42 provided in either the first or second alignment fixture, 14 or 14A, and is aligned with the corresponding alignment fixture axis, either 44 or 46.

The hot tapping device 10 is then secured to the angled surface 24 of one of the alignment fixtures, either 14 or 14A, by means of a boss flange 64 provided on the device 10. As best seen in FIGS. 4 and 6, the boss flange 64 is provided with a flange O-ring 66 which inserts into a groove 68 provided in a base 70 on a lower end 71 of the boss flange 64 before the boss flange 64 is attached to the angled surface 24 and which forms a watertight seal between the angled surface 24 and the boss flange 64 when the boss flange 64 is secured thereto. The base 70 of the boss flange 64 is secured to the angled surface 24 by means of the socket head screws 38 which insert through screw holes 72 provided in the base 70 and which tighten into the corresponding tapped holes 36 provided in the angled surface 24.

The boss flange 64 is provided with a top end 73 opposite the lower end 71. As illustrated in FIGS. 4, 5 and 6, the boss flange 64 is provided with male flange threads 74 located adjacent the top end 73. Slots 76 are provided in the male flange threads 74 so that the slots 76 are parallel with the corresponding alignment fixture axis, either 44 or 46, and are axially aligned with the screw holes 72. The slots 76 are provided so that a wrench 78 can be inserted through the slots 76 in order to loosen or tighten the socket head screws 38, as illustrated in FIG. 8.

Referring now to FIG. 9, the male flange threads 74 are removably engagable with female collar threads 80 provided on a lower knurled collar 82. When the lower knurled collar is tightened onto the boss flange 64, the top end 73 of the boss flange 64 enters an increased internal diameter portion 84 provided on a lower adaptor 86 which is movably attached at one end to the lower knurled collar 82. The top end 73 of boss flange 64 engages an adaptor O-ring 88 provided in a groove 90 of a shoulder 92 formed between the increased internal diameter portion 84 and a decreased internal diameter portion 94 provided adjacent the increased internal diameter portion 84 on the lower adaptor 86, thus forming a watertight seal between the boss flange 64 and the lower adaptor 86.

An opposite end of the lower adaptor 86 is provided with male adaptor threads 96 which secure to a lower end 98 of a ball valve 100, thus forming a watertight seal between the lower adaptor 86 and the ball valve 100.

The ball valve 100 is provided with a ball valve handle 102 which opens communication between the lower end 98 of the ball valve and an opposite upper end 104 provided on the ball valve 100 when the ball valve handle 102 is aligned parallel to the corresponding alignment fixture axis, either 44 or 46. Similarly, communication between the lower and upper ends 98 and 104 is closed when the ball valve handle 102 is aligned perpendicular to the corresponding alignment fixture axis, either 44 or 46.

The upper end 104 of the ball valve 100 is provided with a Schrader valve 106 or other suitable type of pressure relief valve (not illustrated). The upper end 104 of the ball valve 100 secures to an upper adaptor 108 which in turn secures to an upper knurled collar 110. The upper adaptor 108 is identical to the previously described lower adaptor 86, and the upper knurled collar 110 is identical to the previously described lower knurled collar 82. The upper knurled collar 110 is provided with female collar threads 111, shown in FIGS. 10 and 11, similar to the female collar threads 80 provided on the lower knurled collar 82.

A drill assembly 112 is initially removably secured to the upper adaptor 108 by means of male threads 114 provided on a lower end 116 of a threaded tool portion 118 of the drill assembly 112 which engages the female collar threads 111 of the upper knurled collar 110 to form a watertight seal between the upper adaptor 108 and the drill assembly 112. The drill assembly 112 is then ready to be employed to drill a pipe hole 120 through the pipe 12.

An opposite upper end 122 of the threaded tool portion 118 is provided with female threads 124. The threaded tool portion 118 is hollow between its two ends 116 and 122. Communication between the hollow threaded tool portion begins with the female threads 124 which communicate with the upper end 122, thus downwardly from the female threads 124 to consecutively a larger recess 126 adjacent the female threads 124, a smaller recess 128 adjacent the larger recess 126, a reduced inner diameter portion 130 adjacent the smaller recess 128, and finally ending with a normal inner diameter portion 132 adjacent the reduced inner diameter portion 130 which communicates with the lower end 116.

As illustrated in FIGS. 9, 10 and 11, the boss flange 64, the lower adaptor 86, the ball valve 100, and the upper adaptor 108 are each hollow with internal diameters 134, 136, 138, 140 respectively, which are equal to or exceed an internal diameter 141 of the normal inner diameter portion 132 of the threaded tool portion 118. Also, the threaded tool portion 118, the upper adaptor 108, the ball valve 100, the lower adaptor 86 and the boss flange 64 are all aligned along the corresponding alignment fixture axis, either 44 or 46. An enlarged attachment head 142 is provided on a head end 144 of a drill rod 146.

The drill rod 146 and the attachment head 142 are also aligned along the corresponding alignment fixture axis, either 44 or 46. In addition, the attachment head 142 has an external diameter slightly less than the internal diameters 134, 136, 138, 140 and 141 of respectively the boss flange 64, the lower adaptor 86, the ball valve 100, the upper adaptor 108 and the normal inner diameter portion 132 of the threaded tool portion 118, thus allowing the attachment head 142 to be moved through these internal diameters 134, 136, 138, 140, and 141.

The attachment head 142 is provided with a drill receiving cavity 148 into which a shank end 150 of a drill bit 152 inserts. The drill bit 152 is secured to the drill bit receiving cavity 148 by means of a set screw 154 which tightens against the shank end 150 after being screwed into set screw receiving threads 156 which extend through the attachment head 142 perpendicular to the corresponding alignment fixture axis, either 44 or 46. The drill bit 152 is aligned along the corresponding alignment fixture axis, either 44 or 46, so that as the attachment head 142 is moved longitudinally through the device 10 by means of the drill rod 146, a drill end 158 of the drill bit 152 located opposite the shank end 150 inserts through the opening 62 in the drill bushing 30 and through the small hole 42 in the corresponding alignment fixture, either 14 or 14A, and impinges the outside wall 22 of the pipe 12 at a point, either "D" or "D'", where the pipe hole 120 is to be drilled into the pipe 12. The opening 62 and the small hole 42 serve as guides for the drill bit 152 and prevent the drill bit 152 from "walking" down the outside wall 22 of the pipe 12 as it is rotated in order to drill the pipe hole 120.

As shown in FIGS. 10 and 11, in order to drill the pipe hole 120 into the pipe 12, the drill rod 146 and the attached drill bit 152 must be rotated rapidly by a drill 160, or another similar device (not shown), which attaches to a chuck end 162 provided on the drill rod 146 opposite the head end 144.

Referring now also to FIG. 9, the drill rod 146 movably extends through reduced inner diameter portion 130 of the threaded tool portion 118, with the attached head 142 prevented from being pulled upward through the reduced inner diameter portion 130 due to its external diameter which exceeds the diameter of the reduced inner diameter portion 130. Adjacent the threaded tool portion 118, the drill rod 146 extends consecutively through a packing seal 164 and through a drill seal retainer 166. The drill seal retainer 166 is provided with a non-threaded proximal end 168 and an opposite distal end 169. Adjacent the non-threaded proximal end 168, the drill seal retainer 166 is provided with male retainer threads 170.

The male retainer threads 170 engage the female threads 124 of the threaded tool portion 118 in order to force the non-threaded proximal end 168 into the larger recess 126 and against the packing seal 164, thus, forcing the packing seal 164 into the smaller recess 128. Thus confined in the smaller recess 128, the packing seal 164 presses and seals against the drill rod 146 to prevent leakage around the drill rod 146 after the pipe hole 120 has been drilled into the pipe 12 and liquid is admitted into the device 10 via the pipe hole 120. The distal end 169 is provided with flats 171 in order to facilitate turning the drill seal retainer 166 thus enabling it to be tightened against the packing seal 164.

Once the pipe hole 120 is drilled, the drill rod 146 is fully withdrawn upward within the device 10 away from the pipe 12 so that the drill bit 152 clears a ball 172 provided within the ball valve 100. The ball 172 is provided with a longitudinally extending opening 174 therethrough which defines the internal diameter 138 of the ball valve 100. The ball valve 100 is then closed by rotating the ball 172 by means of the ball valve handle 102, as illustrated in FIG. 11, isolating the drill assembly 112 from the pipe 12. The Schrader valve 106 on the ball valve 100 is then employed to release pressure from the upper end 104 of the ball valve 100. The drill assembly 112 is then removed from the device 10 and by unscrewing the female collar threads 111 of the upper knurled collar 110 from the male threads 114 of the threaded tool portion 118.

One of two different cleaning assemblies, either cleaning assembly 200 or alternate cleaning assembly 300, for cleaning the device 10 is next employed, depending on whether the pipe 12 is magnetic or nonmagnetic. When the pipe 12 is magnetic, after the drill assembly 112 is removed from the device 10, it is replaced by the cleaning assembly 200, as illustrated in FIG. 12. The cleaning assembly 200 utilizes a threaded tool portion 118, a packing seal 164, and a tool seal retainer 166 identical to the threaded tool portion 118, the packing seal 164 and the tool seal retainer 166 previously described for the drill assembly 112.

An enlarged magnet attachment head 202 is provided on a magnet end 204 of a magnet rod 206. The magnet attachment head 202 has an external diameter which, similar to the attachment head 142, is slightly less than internal diameters 134, 136, 138, 140, and 141 of respectively the boss flange 64, the lower adaptor 86, the ball valve 100, the upper adaptor 108, and the normal inner diameter portion 132 of the threaded tool portion 118. Because the magnet rod 206 is aligned along the corresponding alignment fixture axis, either 44 or 46, the magnet attachment head 202 can move through the threaded tool portion 118, the upper adaptor 108, the ball valve 100, the lower adaptor 86, and the boss flange 64 similar to the previously described movement of the attachment head 142 of the drill assembly 112.

The magnet attachment head 202 is provided with a magnet receiving cavity 208 which receives a securing end 210 of a magnet 212, the securing end 210 is preferably provided with a flattened portion (not illustrated) engagable by a set screw 214 extending through the magnet attachment head 202 perpendicular to the corresponding alignment fixture axis 44 or 46 in order to secure the magnet 212 to the magnet rod 206.

The magnet 212 is aligned along the corresponding alignment fixture axis, either 44 or 46, so that as the magnet 212 is moved longitudinally downward through the device 10 by means of the magnet rod 206 until an attracting end 216 provided opposite the securing end 210 on the magnet inserts into the boss flange 64 and bottoms out in the device 10 adjacent the drill bushing 30.

Magnetic metal shavings 218, illustrated in FIG. 12, were previously forced by liquid pressure upward into the boss flange 64 via the pipe hole 120 when the pipe 12 was breached during drilling of the pipe hole 120. The magnetic metal shavings 218 must be removed from the device 10 in order that they will not interfere with the installation of the sensor carrier 34, as will hereinafter be described in more detail.

The magnetic metal shavings 218 are attracted to the attracting end 216 of the magnet 212, as illustrated in FIG. 13, and adhere to the magnet 212. The magnet 212 is then withdrawn fully upward in the device 10 by means of the magnet rod 206 which movably extends through the reduced inner diameter portion 130 of the threaded tool portion 118. When the magnet 212 is withdrawn fully upward in the device 10, magnet attachment head 202 is located within the normal inner diameter portion 132 because the magnet attachment head 202 is too large to be pulled through the reduced inner diameter portion 130. A handle 220 is removably secured by means of a screw 222 or other suitable means (not illustrated), to a handle end 224 located opposite the magnet end 204 on the magnet rod 206 in order to facilitate movement of the magnet rod 206 within the device 10.

After the magnet 212 is withdrawn so that it clears the ball valve 100, the ball 172 is rotated to close the ball valve 100, the Schrader valve 106 is employed to release pressure from the upper end 104 of the ball valve 100, and the cleaning assembly 200 is removed from the device 10 by unscrewing the female collar threads 111 of the upper knurled collar 110 from the male threads 114 on the threaded tool portion 118. Cleaning assembly 200 is then cleaned of magnetic shavings 118 and is repeatedly reattached to the device 10, with the previously described cleaning sequence being repeated until the device 10 is free of magnetic metal shavings 218, ending with removal of the cleaning assembly 200 from the device 10.

Alternately, as illustrated in FIGS. 14, 15 and 16 for a pipe 12 which is not magnetic, after the drill assembly 112 is removed, it is replaced by an alternate cleaning assembly 300. The alternate cleaning assembly 300 utilizes a threaded tool portion 118, a packing seal 164, and a tool seal retainer 166 identical to the threaded tool portion 118, the packing seal 164 and the tool seal retainer 166 previously described for the drill assembly 112 and for the cleaning assembly 200. The alternate cleaning assembly 300 employs a hollow stir rod 302 which movably inserts through the reduced inner portion 130 of tool portion 118.

An enlarged stirrer head 304 is provided on a stirrer end 306 of a stir rod 302, and male stir rod threads 308 are provided on an opposite cleaning assembly valve end 310. The stirrer head 304 and the stir rod 302 are aligned along the corresponding alignment fixture axis, either 44 or 46. In addition, the stirrer head 304 has an external diameter which, similar to attachment head 142 and magnet attachment head 202, is slightly less than the internal diameters 134, 136, 138, 140, and 141 of respectively the boss flange 64, the lower adaptor 86, the ball valve 100, the upper adaptor 108 and the normal inner diameter portion 132 of the threaded tool portion 118, thus allowing the stirrer head 304 to be moved through these internal diameters 134, 136, 138, 140, and 141.

The stirrer head 304 is provided with a holder recess 312 into which a hollow holder 314 inserts. The holder 314 is secured in the holder recess 312 by means of a set screw 316 which tightens against a flat area 318 provided on a rod end 320 of the holder 314. The set screw 316 is screwed into set screw receiving threads 322 which are provided in the stirrer head 304 perpendicular to the corresponding alignment fixture axis, either 44 or 46 and which extend through the stirrer head 304.

An opposite slotted end 324 of the holder 314 is provided with slots 326 into which a stirring plate 328 inserts. The stirring plate 328 is secured within the slots 326 by means of welding, or other suitable means, so that a pair of broad flat stirring surfaces 330 provided on the stirring plate 328 are aligned parallel with the corresponding alignment fixture axis, either 44 or 46. The stirring plate 328 is spaced away from the holder 314 so that liquid entering the slotted end 324 of holder 314 from the pipe 12 via the newly drilled pipe hole 120 passes between the stirring surfaces 330 and the holder 314, passes through the holder 314, exits the rod end 320 of the holder 314 and enters the stirrer end 306 of the hollow stir rod 302, travels through the stir rod 302 until it exits the cleaning assembly valve end 310 of the stir rod 302.

To facilitate the flow of liquid through the cleaning assembly 300, one side of a cleaning assembly valve 332 attaches to the male stir rod threads 308 via a reducing bushing 334. An opposite side of the cleaning assembly valve 332 attaches to a male hose barb 336 provided on one end of a flexible hose 338; an opposite end of the hose 338 is open. When the cleaning assembly valve 332 is opened, liquid flows through the holder 314 and the stir rod 302 in the manner previously described, exiting the cleaning assembly valve end 310 of the stir rod 302 and passes through the cleaning assembly valve 332 before being flushed out via the hose 338. The purpose for establishing this liquid flow is to flush out any non-magnetic shavings (not shown) remaining in the device 10 after the pipe hole 120 is drilled. If these non-magnetic shavings (not shown) are not removed, proper installation of the sensor carrier 34, as will hereinafter be described in more detail, is hampered by the presence of the non-magnetic shavings (not shown).

During the time when the cleaning assembly valve 332 is open and liquid is flowing therethrough, the stir rod 302 is rotated so that the attached stirring plate 328 stirs the non-magnetic shavings (not shown) so that they enter the flow of liquid and are flushed out of the device 10. This stirring action reduces the amount of liquid which must be flushed out of the pipe 12 through the alternate cleaning assembly 300 in order to adequately clear the device 10 of non-magnetic shavings (not shown). Small loss of liquid is particularly desirable in HVAC system where the liquid is often expensive to replace and, for example in the case of either ethylene or propylene glycol, can also be expensive to properly dispose of the liquid after it is flushed out through the hose 338.

When the device 10 has been sufficiently cleaned of non-magnetic shavings (not shown), the cleaning assembly valve 332 is closed, the stir rod 302 is withdrawn from the device sufficiently so that the holder 314 and the attached stirring plate 328 clear the ball 172 in the ball valve 100. The ball 172 is then rotated to close the ball valve 100, isolating the alternate cleaning assembly 300 from the pipe 12. The Schrader valve 106 is then employed to relieve pressure on the upper end 104 of the ball valve 100, and the alternate cleaning assembly 300 is then removed from the device 10 by unscrewing the female collar threads 111 of the upper knurled collar 110 from the male threads 114 of the threaded tool portion 118.

After either the cleaning assembly 200 or the alternate cleaning assembly 300 is removed from the device 10, it is replaced by an extraction assembly 400. As shown in FIGS. 17, 18 and 19, the extraction assembly 400 utilizes a threaded tool portion 118, a packing seal 164, and a tool seal retainer 166 identical to the threaded tool portion 118, the packing seal 164 and the tool seal retainer 166 previously described for the drill assembly 112, for the cleaning assembly 200 and for the alternate cleaning assembly 300. The extraction assembly 400 is provided with an extraction rod 402 which movably inserts through the reduced inner diameter portion 130 in threaded tool portion 18. An enlarged extraction rod head 404 is provided on a retainer end 406 of the extraction rod 402, and an opposite handle end 408 is provided with a handle 410 which removably attaches to the extraction rod 402 by means of a screw 411 or other suitable means (not illustrated). The handle 410 is preferably identical to handle 220 employed in the cleaning assembly 200.

The extraction rod head 404 has an external diameter which, similar to the attachment head 142, the magnet attachment head 202 and the stirrer head 304, is slightly less than the internal diameters 134, 136, 138, 140 and 141 of respectively the boss flange 64, the lower adaptor 86, the ball valve 100, the upper adaptor 108 and the normal inner diameter portion 132 of the threaded tool portion 118, thus allowing the extraction rod head 404 to be moved through these internal diameters 134, 136, 138, 140 and 141.

The extraction rod head 404 is provided with a pair of internally flattened ears 412 extending longitudinally from an internal cavity 414 provided in the extraction rod head 404 and the ears 412 are engagable with the flats 56 provided on the external end 58 of the drill bushing 30. The internal cavity 414 has an internal diameter slightly larger than the diameter of the external end 58 of the drill bushing 30 so that the internal cavity 414 can accommodate the external end 58.

Referring still to FIGS. 17, 18 and 19, the extraction rod head 404 is also provided with female extraction threads 416 engagable with male drill bushing retainer threads 418 provided on an attaching end 420 of a drill bushing retainer 422. A threaded opening 421 is provided extending through the extraction rod head 404 so that it is perpendicular to the corresponding alignment fixture axis, either 44 of 46, and communicates with the female extraction threads 416. A set screw 423 removably inserts through the threaded opening 421 and engages a flat 425 provided on the male drill bushing retainer threads 418 as a means of securing the drill bushing retainer 422 to the extraction rod head 404.

The drill bushing retainer 422 is provided with at least one circumferential groove 424. An O-ring 426 inserts into each groove 424. An extending end 428 provided on the drill bushing retainer 422 opposite the attaching end 420 is provided with flats 430 to facilitate gripping the drill bushing retainer 422 as it is rotated to secure it to the extraction rod head 404.

The purpose of the extraction assembly 400 is to detach the drill bushing 30 from the corresponding alignment fixture, either 14 or 14A, and once the drill bushing 30 is detached, to remove it from the device 10. This is done by rotating the ball 172 to open the ball valve 100 and extending the extraction rod 402 toward the pipe 12 until the internally flattened ears 412 engage the flats 56 on the drill bushing 30. The handle 410 is then turned to unscrew the male threads 28 on the drill bushing 30 from the female threaded opening 26 in the corresponding alignment fixture, either 14 or 14A. Once detached from the corresponding alignment fixture, either 14 or 14A, the drill bushing 30 adheres to the drill bushing retainer 422 by virtue of the O-rings 426 that previously engaged the opening 62 of the drill bushing 30 as the extraction rod 402 was moved toward the pipe 12.

The extraction rod 402 and attached drill bushing 30 are then withdrawn upward past the ball 172 of the ball valve 100, the ball 172 is rotated to close the ball valve 100, and the Schrader valve 106 is employed to release pressure on the upper end 104 of the ball valve 100. The extraction assembly 400 is then removed from the device by unscrewing the female collar threads 111 on the upper knurled collar 110 from the male threads 114 on the threaded tool portion 118.

After the extraction assembly 400 is removed, it is replaced by an insertion assembly 500, illustrated in FIG. 20. The insertion assembly 500 employs a threaded tool portion 118, a packing seal 164 and a tool seal retainer 166 identical to the threaded tool portion 118, the packing seal 164 and the tool seal retainer 166 previously described for the drill assembly 112, for the cleaning assembly 200, for the alternate cleaning assembly 300 and for the extraction assembly 400. The insertion assembly 500 is provided with an insertion rod 502 which movably inserts through the reduced inner diameter portion 130.

An enlarged insertion rod head 504 is provided on a retainer end 506 of the insertion rod 502 and an opposite handle end 508 is provided with a handle (not shown) which removably attaches to the insertion rod 502 by means of a screw (not shown) or other suitable means. The insertion rod head 504 has an external diameter which, similar to the attachment head 142, the magnet attachment head 202, the stirrer head 304 and the extraction rod head 404, is slightly less than the internal diameters 134, 136, 138, 140, and 141 of respectively the boss flange 64, the lower adaptor 86, the ball valve 100, the upper adaptor 108 and the normal inner diameter portion 132 of the threaded tool portion 118, thus allowing the attachment head 142 to be moved through these internal diameters 134, 136, 138, 140, and 141.

The handle (not shown) employed on the insertion assembly 500 is preferably identical to the handles 220 and 410 employed respectively on the cleaning assembly 200 and the extraction assembly 400.

A threaded opening 509 which is perpendicular to the corresponding alignment fixture axis, either 44 or 46, is provided extending through the insertion rod head 504. A set screw 510 removably inserts through the threaded opening 509.

Referring now to FIGS. 20, 21 and 22, the insertion rod head 504 is provided with a pair of internally flattened ears 512 extending longitudinally from an internal cavity 514 and engagable with flats 515 provided on the sensor carrier 34 adjacent the male threads 32. The internal cavity 514 has an internal diameter slightly larger than a diameter of male cap threads 516 provided on an external end 518 of the sensor carrier 34 so that the internal cavity 514 can accommodate the external end 518.

The insertion rod head 504 is also provided with female extraction threads 520 engagable with male sensor carrier retainer threads 522 provided on an attaching end 524 of a sensor carrier retainer 526. The male sensor carrier retainer threads 522 are provided with a flat 527 which is engagable by the set screw 510 in order to secure the sensor carrier retainer 526 to the insertion rod head 504. The sensor carrier retainer 526 is provided with at least one circumferential groove 528, and O-ring 530 inserts into each groove 528. An extending end 532 provided on sensor carrier retainer 526 opposite the attaching end 524 is provided with flats 534 to enable the sensor carrier retainer 526 to be screwed into the female extraction threads 520 in the insertion rod head 504. The extending end 532 is also provided with a longitudinally extending hole 536 which communicates between the extending end 532 and the attaching end 524 and also intersects and provides communicates with a perpendicularly extending hole 538 located between the male sensor carrier retainer threads 522 and the groove 528 located adjacent to the male sensor carrier retainer threads 522.

The purpose of the holes 536 and 538 is to prevent pressure from building up within the sensor carrier 34 as the sensor carrier 34 is attached to the sensor carrier retainer 526 and to prevent a vacuum from being formed within the sensor carrier 34 as the sensor carrier 34 is subsequently detached from the sensor carrier retainer 526. Buildup of pressure within the sensor carrier 34 is undesirable as it tends to cause a window 540 which is secured to a lower internal end 541 of the sensor carrier 34 by means of an O-ring 542 residing in a circumferential groove 544 to be forced out of a window recess 546 provided in the lower end 541 of the sensor carrier 34. Formation of a vacuum within the sensor carrier 34 is undesirable as it can work against efforts to detach the sensor carrier 34 from the sensor carrier retainer 526 and can also cause the window 540 to implode.

The purpose of the insertion assembly 500 is to attach the sensor carrier 34 to the alignment fixture, either 14 or 14A. As illustrated in FIGS. 20 and 21, this is done by first inserting the sensor carrier 34, external end 518 first, onto the sensor carrier retainer 526 which is attached to the insertion rod head 504 so that the flats 515 provided on the sensor carrier 34 are engaged by the flattened ears 512 and the O-rings 530 engage an internal bore 548 provided in the sensor carrier 34.

Next, the insertion assembly 500 with attached sensor carrier 34 is attached to the device 10 by engaging the female collar threads 111 of the upper knurled collar 110 with the male threads 114 of the threaded tool portion 118. The ball 172 of the ball valve 100 is then rotated to open the ball valve 100 and the sensor carrier 34 is pushed by means of the insertion rod 502 toward the pipe 12. As the sensor carrier 34 approaches the pipe 12, the lower internal end 541 of the sensor carrier 34 enters the large hole 40 in the corresponding alignment fixture, 14 or 14A, and the male threads 32 of the sensor carrier 34 engage the female threaded opening 26 of the corresponding alignment fixture 14 or 14A. The sensor carrier 34 is provided externally with a circumferential groove 550 adjacent the lower internal end 541 into which an O-ring 552 inserts. The O-ring 552 functions to provide a watertight seal between the sensor carrier 34 and the corresponding alignment fixture 14 or 14A into which the sensor carrier 34 is inserted. The sensor carrier 34 is then rotated by means of the insertion rod 502 until it is secured to the corresponding alignment fixture 14 or 14A.

The Schrader valve 106 provided on the ball valve 100 is then opened to relieve pressure from within the device 10 and to determine whether the sensor carrier 34 has formed a watertight seal with the corresponding alignment fixture, either 14 or 14A. If the sensor carrier 34 is properly installed, the device 10 is removed from the corresponding alignment fixture, either 14 or 14A, by removing socket head screws 38. Once removed from the alignment fixture 14 or 14A, the device 10 is ready for reuse.

Figure 24:
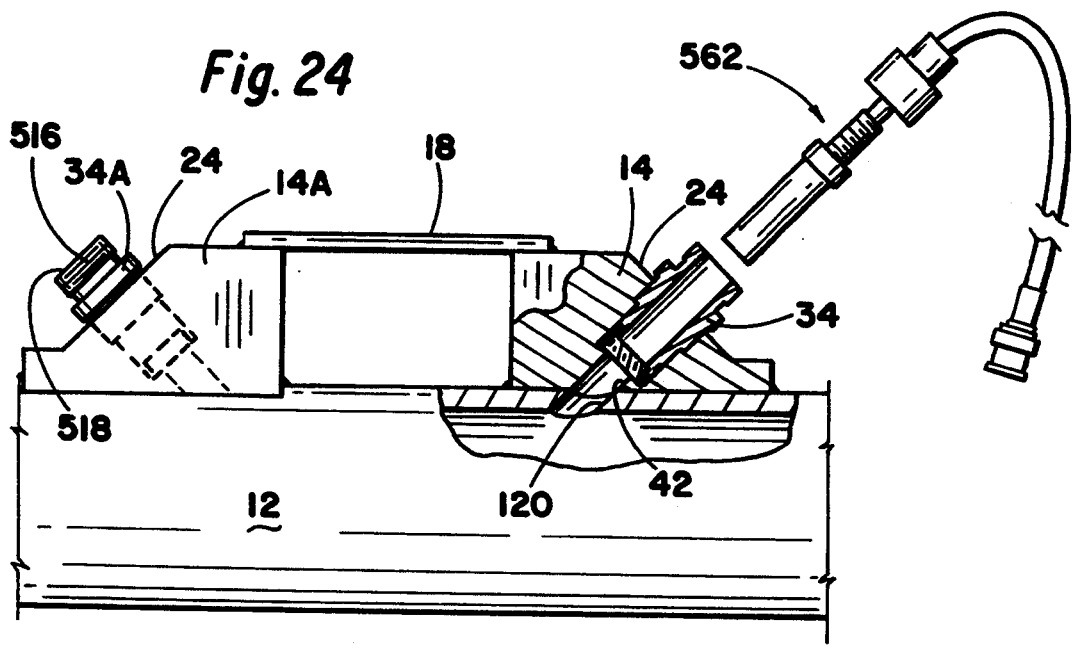
FIG. 24 is a partially cutaway front elevation showing installation of a sonic flowmeter transducer in one of the carriers.
Figure 25:
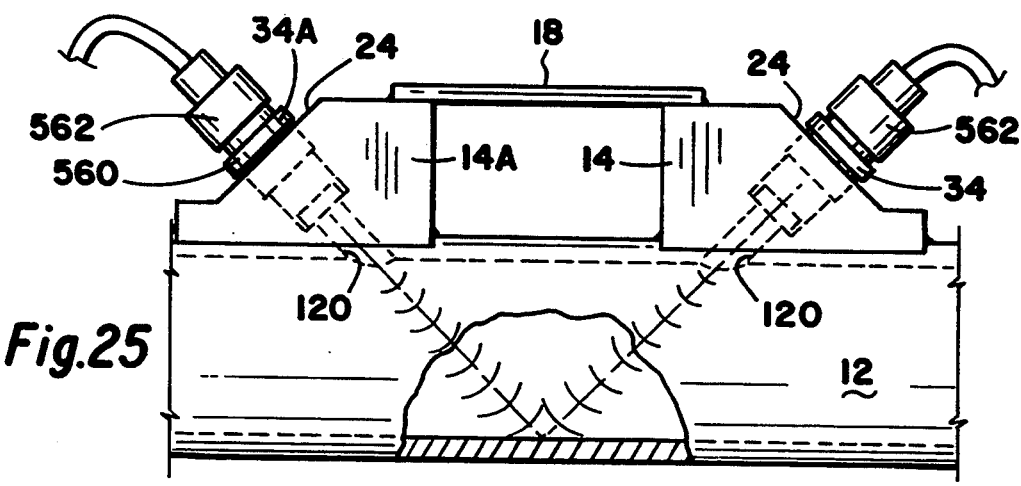
FIG. 25 is a diagram illustrating how the sound waves originating from each of the two installed sonic flowmeter transducers bounce off of the pipe's interior wall and are received by the opposite sonic flowmeter transducer.
Figure 26:
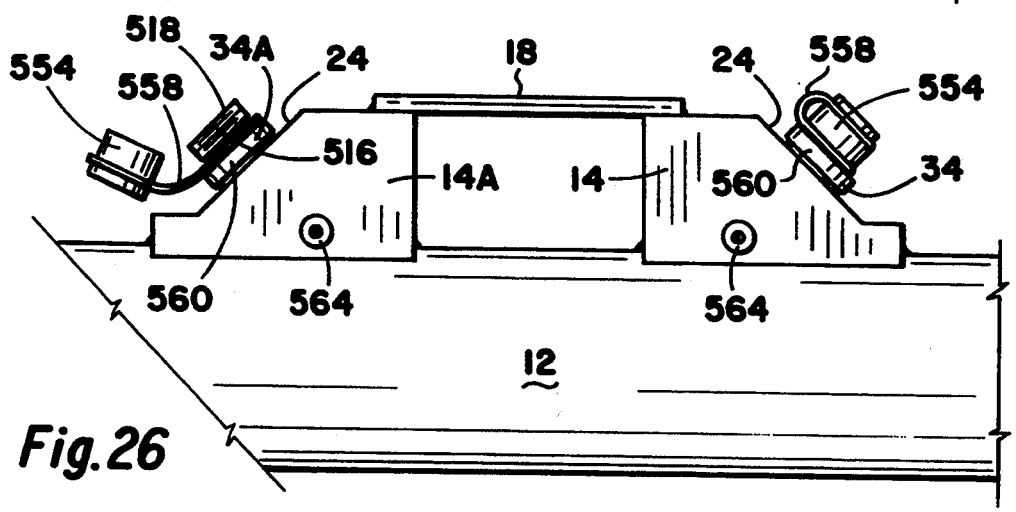
FIG. 26 is a front elevation which shows carrier caps being secured to the carriers after the sonic flowmeter transducers are removed.

Referring now to FIGS. 24, 25 and 26, once the device 10 has been removed a female threaded carrier cap 554 engages the male cap threads 516 on the sensor carrier 34 in order to seal the external end 518 of the sensor carrier 34 to prevent debris (not illustrated) from entering the hollow sensor carrier 34. The carrier cap 554 may be optionally provided with a cap retainer 558 which attaches one end around the carrier cap 554 and by an opposite end around the external end 518 of the sensor carrier 34 between the male cap threads 516 and a shoulder 560 provided on the sensor carrier 34 between the male cap threads 516 and the male threads 32. The flats 515 are preferably located in the shoulder 560.

Once the first sensor carrier 34 is in place in the first alignment fixture 14, the device 10 is similarly employed to provide a second sensor carrier 34A in the second alignment fixture 14A so that the angle "B" is formed between the first alignment fixture axis 44 and the second alignment fixture axis 46. The two sensor carriers 34 and 34A are thus ready to be used for measuring liquid flow within the pipe 12 by replacing the carrier caps 554 with sonic flowmeter transducers 562, as illustrated in FIGS. 24 and 25, or other similar flow measuring equipment (not shown). After flow measurements have been made, the sonic flowmeter transducers 562 are removed and the carrier caps 554 replaced.

Optionally, for installations were the longitudinal axis 48 of the pipe 12 is perpendicular to the force of gravity, the alignment fixtures 14 and 14A may each be provided with alternate Schrader valves 564, or other similar types of valves, in order to bleed off air which may be trapped in the small hole 42 adjacent the window 540 after the sensor carrier 34 has been installed.

The Method

In order to drill the pipe hole 120 into the pipe 12 at the angle "C" the two alignment fixtures 14 and 14A are appropriately positioned on the pipe 12 and welded thereto. Next, the drill bushing 30 and the hot tapping device 10 with attached drill assembly 112 are secured to the first alignment fixture 14. The ball valve 100 is opened and the drill bit 152 is moved toward the pipe 12 until it abuts the pipe 12. The drill bit 152 it then rotated by means of the drill rod 146 until a pipe hole 120 is created in the pipe. The drill bit 152 is then moved away from pipe 12 until the drill bit 152 clears the ball valve 100. The ball valve 100 is then closed, isolating the drill assembly 112 from the pipe. The Schrader valve 106 is opened and the drill assembly 112 is then removed from the device 10 and replaced with either the cleaning assembly 200 for pipes 12 which are magnetic, or replaced by the alternate cleaning assembly 300 for pipes 12 which are non-magnetic.

If the cleaning assembly 200 is employed, the ball valve 100 is reopened and the magnet 212 is moved toward the pipe 12 until it bottoms out in the device 10 in order to retrieve the magnetic shavings 218. The magnet 212 with adhering magnetic shavings 218 is next withdrawn past the ball valve 100, the ball valve 100 is closed, the Schrader valve 106 is opened, and the cleaning assembly 200 is removed and cleaned of magnetic metal shavings 218. This cleaning process is repeated until the device 10 is cleaned of magnetic metal shavings 218. Once the device 10 is cleaned of magnetic metal shavings, the cleaning assembly 200 is removed from the device 10 and replaced with the extraction assembly 400.

If the alternate cleaning assembly is employed, the ball valve 100 is reopened and the stir rod 302 is used to move the holder 314 and the attached stirring plate 328 toward the pipe 12 until they bottom out in the device 10. The cleaning assembly valve 332 is then opened and the stir rod 302 is rotated to flush non-magnetic shavings (not shown) out of the device 10. The cleaning assembly valve 332 is then reclosed and the holder 314 and attached stirring plate 328 are moved away from the pipe 12 until they clear the ball valve 100. The ball valve 100 is then closed, isolating the alternate cleaning assembly 300 from the pipe 12. The Schrader valve 106 is then opened and the alternate cleaning assembly 300 is removed from the device 10 and replaced with the extraction assembly 400.

Once the extraction assembly 400 is secured to the device, the ball valve 100 is reopened and the extraction assembly 400 is moved toward the pipe 12 where it engages the drill bushing 30 and removes the drill bushing 30 from the alignment fixture 14. The drill bushing 30 is then withdrawn past the ball valve 100, the ball valve 100 is closed, and the Schrader valve is opened.

The extraction assembly 400 is then removed from the device 10 and replaced with the insertion assembly 500 to which a sensor carrier 34 has been removably secured. The ball valve 100 is reopened, the sensor carrier 34 is moved toward the pipe 12 and the sensor carrier 34 is secured within the alignment fixture 14. The Schrader valve is then opened to check whether the sensor carrier 34 has formed a watertight seal with the alignment fixture 14 before the device 10 is removed from the alignment fixture 14. A cap carrier 554 is screwed onto the male cap threads 516 of the sensor carrier 34 to prevent debris (not shown) from entering sensor carrier 34. The carrier cap 554 will remain on the sensor carrier 34 until removed and replaced with flow measuring equipment, such as the sonic flow meter transducers 562.

The same process is repeated at the second alignment fixture 14A in order to drill a second pipe hole 120 into the pipe 12 and to secure a second carrier 34A to the second alignment fixture 14A.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of hot tapping a pipe and permanently installing a pair of carriers for use with sonic flowmeter transducers comprising the following steps:

(a) permanently securing first and second alignment fixtures to an outside wall of a pipe so the alignment fixtures are aligned with each other along and parallel to a longitudinal axis of the pipe and are an appropriate distance apart;

(b) removably securing a drill bushing within the first alignment fixture;

(c) removably attaching a hot tapping device equipped with a removably attached drill assembly to an angled surface provided on the first alignment fixture;

(d) opening a valve provided on the hot tapping device and moving a drill bit provided on the drill assembly toward the pipe until the drill bit abuts the pipe;

(e) rotating the drill bit to create a hole in the pipe;

(f) moving the drill bit away from the pipe until the drill bit clears the valve;

(g) closing the valve to isolate the drill assembly from the pipe and opening a pressure relief valve provided on the valve in order to relieve pressure on the drill assembly;

(h) removing the drill assembly from the hot tapping device;

(i) securing a cleaning assembly to the hot tapping device;

(j) opening the valve and moving a magnet provided on the cleaning assembly toward the pipe until the magnet bottoms out in the device and attracts magnetic metal shavings which adhere to the magnet;

(k) moving the magnet away from the pipe until the magnet clears the valve;

(l) closing the valve to isolate the cleaning assembly from the pipe and opening the pressure relief valve in order to relieve pressure on the cleaning assembly;

(m) removing the cleaning assembly from the hot tapping device and cleaning the magnetic metal shavings from the magnet;

(n) repeating steps (i) through (m) until the hot tapping device is cleaned of magnetic metal shavings;

(o) securing an extraction assembly to the hot tapping device;

(p) opening the valve, moving the extraction assembly toward the pipe, engaging the drill bushing with the extraction assembly and removing the drill bushing from the first alignment fixture;

(q) moving the drill bushing away from the pipe until the drill bushing clears the valve;

(r) closing the valve to isolate the extraction assembly from the pipe and opening the pressure relief valve in order to relieve pressure on the extraction assembly;

(s) removing the extraction assembly from the hot tapping device and replacing the extraction assembly with an insertion assembly to which a first carrier is removably attached;

(t) opening the valve, moving the first carrier toward the pipe by means of the insertion assembly and securing the first carrier to the first alignment fixture;

(u) opening the pressure relief valve to check whether the first carrier is properly secured to the first alignment fixture;

(v) removing the hot tapping device from the first alignment fixture; and (w) repeating steps (b) through (v) for the second alignment fixture and employing a second carrier instead of the first carrier.

2. A method according to claim 1 further comprising the following step:

(x) removably capping the first and second carriers with carrier caps to prevent debris from entering the carriers.

* * * * *

UNITED STATES PATENT AND TRADEMARK OFFICE
CERTIFICATE OF CORRECTION

PATENT NO. : 5,396,814

DATED : March 14, 1995

INVENTOR(S) : Dennis H. Tuttle, Henry E. Ryer and Larry T. Riley

It is certified that error appears in the above-indentified patent and that said Letters Patent is hereby corrected as shown below:

On the title page: Item [54]

Line 1    Change "HAT" to --HOT--,

Line 2    Change "IONIC" to --SONIC--.

Column 1, Line 2    Change "HAT" to --HOT--,

Line 3    Change "IONIC" to --SONIC--.

Column 2, line 1,
Page 1, Item [56],    Change "Lynnworel" to --Lynnworth--.

UNITED STATES PATENT AND TRADEMARK OFFICE
CERTIFICATE OF CORRECTION

PATENT NO. : 5,396,814
DATED : March 14, 1995
INVENTOR(S) : Dennis H. Tuttle, Henry E. Ryer and Larry T. Riley It is certified that error appears in the above-indentified patent and that said Letters Patent is hereby corrected as shown below:

Column 9, Line 40    Change "118" to --218--.

Column 11, Line 22    Change "18" to --118--.

Signed and Sealed this

Eighth Day of August, 1995

*Attest:*

BRUCE LEHMAN

*Attesting Officer*    *Commissioner of Patents and Trademarks*